United States Patent [19]

Bolgiano et al.

[11] 4,420,499

[45] Dec. 13, 1983

[54] PROCESS FOR PROVIDING IMPROVED RADIATION-CURABLE SURFACE COVERINGS AND PRODUCTS PRODUCED THEREBY

[75] Inventors: Nicholas C. Bolgiano, East Hempfield Township, Lancaster County; William T. Sigman, Eden Township, Lancaster County, both of Pa.

[73] Assignee: Armstrong World Industries, Inc., Lancaster, Pa.

[21] Appl. No.: 389,163

[22] Filed: Jun. 17, 1982

Related U.S. Application Data

[63] Continuation-in-part of Ser. No. 314,989, Oct. 26, 1981, abandoned.

[51] Int. Cl.³ ............................................. B05D 3/06
[52] U.S. Cl. .................. 427/53.1; 427/54.1; 427/407.1; 204/159.22; 264/22; 264/171
[58] Field of Search .............. 427/44, 53.1, 54.1, 427/407.1; 204/159.22; 264/171, 22

[56] References Cited

U.S. PATENT DOCUMENTS

| | | | |
|---|---|---|---|
| 3,455,643 | 7/1969 | Gruber et al. | 427/44 |
| 3,565,780 | 2/1971 | Zimmerman | 427/44 |
| 3,717,558 | 2/1973 | McGinniss | 427/44 |
| 3,759,807 | 9/1973 | Osborn et al. | 427/44 |
| 3,874,906 | 4/1975 | Prucnal et al. | 427/54.1 |
| 3,924,023 | 12/1975 | Boranian et al. | 427/54.1 |
| 4,075,366 | 2/1978 | Packer et al. | 427/44 |

*Primary Examiner*—John H. Newsome
*Attorney, Agent, or Firm*—Laird F. Miller

[57] ABSTRACT

The present invention relates to improved flooring materials and to a process for making said materials whereby a first layer on a support which is curable by actinic radiation is coated with a layer of a solution comprising water, an N-vinyl lactam, a suitable surfactant and, if desired, organic solvents. Upon irradiating the two layers, a tough, durable surface is formed having characteristics superior to those presently known in the art.

78 Claims, No Drawings

PROCESS FOR PROVIDING IMPROVED RADIATION-CURABLE SURFACE COVERINGS AND PRODUCTS PRODUCED THEREBY

The present application is a continuation-in-part of copending application Ser. No. 314,989, filed Oct. 26, 1981 now abandoned.

The present invention relates to radiation-curable coatings, and more particularly, to radiation-curable coatings which have a scratch resistant and easily cleanable surface.

BACKGROUND OF THE INVENTION

Radiation and moisture curable coatings are well known in the art and are desirable because they provide finishes which tend to be tough and abrasion resistant. Nevertheless, when these surfaces are exposed to wear, particularly as floor coverings, scratches and gouges are created; therefore, much time and effort have been spent by industry to develop materials which will demonstrate improved durability and cleanability.

THE PRIOR ART

A variety of references describe UV curable coatings and compositions. For example, U.S. Pat. No. 4,138,299 (Bolgiano) discloses a liquid coating comprising (1) a urethane prepolymer which is essentially —NCO terminated but which is partially capped with a monohydroxy acrylate and (2) ethylenically unsaturated acrylate diluents. The ethylenic functions are photopolymerized and the —NCO groups are moisture cured to give a tough, glossy coating. U.S. Pat. No. 3,959,521 (Tazuke et al.) discloses a process whereby a composition comprising ethylenic unsaturation and free isocyanate is coated on a substrate and irradiated. A resinous top coating comprising ethylenically unsaturated groups is then applied and the surface is again irradiated. U.S. Pat. No. 4,100,318 (McCann et al.) discloses a floor covering comprising at least one organic compound having at least two photopolymerizable ethylenically unsaturated groups per molecule, the coating being essentially solvent free. U.S. Pat. No. 4,171,387 (Fogle et al.) discloses cellulosic substrates coated with a urethane adhesive and a UV curable urethane top coat comprising polyacrylate resin. U.S. Pat. No. 4,180,615 (Bettoli) discloses vinyl flooring having a UV curable top coat comprising an essentially solvent free urethane having at least two photopolymerizable ethylenically unsaturated groups. U.S. Pat. No. 4,188,455 (Howard) discloses unsaturated urethane oligomers which are UV curable in air, the oligomers being derived from at least one active hydrogen-containing compound, at least one polyisocyanate and at least one polyether ester. U.S. Pat. No. 4,216,267 (Lorenz et al.) discloses urethane coating compositions comprising an oligomer of a specified formula, an acrylic UV light absorber and, preferably, a vinyl monomer copolymerizable with the oligomer. U.S. Pat. No. 4,233,425 (Terfertiller et al.) discloses UV or chemically curable addition polymerizable polyethers having pendant ethylenically unsaturated urethane groups. These and other references are directed to UV curable compositions which are useful as flooring materials; nevertheless, the need to develop improved flooring materials still exists.

Accordingly, one objective of the present invention is to provide a process for making coatings which demonstrate superior toughness, are resistant to marring and staining, and which resist abrasion.

Yet another objective of the present invention is to provide a process whereby radiation-curable substrates may be treated to give surfaces having improved cleanability.

Still yet another objective of the present invention is to provide floor coverings having improved durability, resistance to marring and staining, yet having superior cleanability.

These and other advantages of the present invention will become apparent from the detailed description of preferred embodiments which follows.

SUMMARY OF THE INVENTION

The present invention relates to improved flooring materials and to a process for making said materials whereby a substrate which is curable by actinic radiation is treated with a solution comprising water, an N-vinyl lactam, a suitable surfactant and, if desired, organic solvents. Upon irradiating the treated substrate, a tough, durable surface is formed having characteristics superior to those presently known in the art.

DETAILED DESCRIPTION OF PREFERRED EMBODIMENTS

In one embodiment, the present invention relates to a process for treating substrates which are curable by exposure to actinic radiation, said process comprising the steps of preparing a solution comprising water, from about 0.1 to about 75 percent by weight of an N-vinyl lactam having the structure

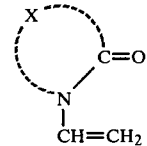

where X is an alkylene bridge having 3 to 5 carbon atoms, and from about 0.01 to about 5 percent by weight of a suitable surfactant; depositing a layer of said solution on said substrate; and exposing the treated substrate to actinic radiation.

In a second embodiment, the present invention relates to a coated substrate having improved durability, abrasion resistance and stain resistance, said substrate being obtained by irradiating with actinic radiation a surface which is curable by exposure to said radiation, said surface being coated prior to irradiation with an aqueous solution comprising from about 0.1 to about 75 percent by weight of an N-vinyl lactam having the structure

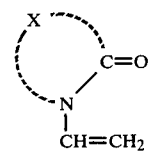

where X is an alkylene bridge having 3 to 5 carbon atoms, and from about 0.01 to about 5 percent by weight of a suitable surfactant.

A number of uses for N-vinyl lactams such as N-vinylpyrrolidone are found in the prior art. For example, it may be used as a comonomer to modify the characteristics of the monomers with which it is used, as in Lorenz, et al.; it may be used as a viscosity reducer and as a photochemical curing accelerator in UV-curable coatings, as in U.S. Pat. No. 3,874,906 to Prucnal et al.; and it may be used in coating compositions used to impart hydrophilic properties to a hydrophobic substrate, as in Tazuke et al. However, nowhere in the prior art is it taught or suggested that aqueous solutions comprising an N-vinyl lactam, such as N-vinylpyrrolidone, and a surfactant can be deposited on a radiation-curable substrate and irradiated, thereby imparting superior wear properties to the treated substrate.

Surprisingly, we have discovered that a radiation-curable substrate may be coated with an aqueous solution comprising N-vinylpyrrolidone, or other N-vinyl lactams, a suitable surfactant and, if desired, organic solvents, and then subjected to actinic radiation to effect curing. The resulting cured surface will possess superior resistance to scratching and gouging, and will demonstrate superior cleanability. Further, the process may be used in certain instances to produce deglossed surface coverings. Thus, such surfaces are remarkably suited for use as floor coverings.

This process for producing surfaces having improved scratch resistance and ease of cleanability need not be practiced on surfaces which are totally uncured. For example, prior to coating the radiation-curable surface with the aqueous solution of the present invention, the surface may be cured to a tacky finish, such as by irradiation in air or by irradiation with a dose of radiant energy which is insufficient to effect complete curing. Thereafter, when the tacky surface is treated according to the present invention, a surface is obtained, which is resistant to gouging and scratching, and is easy to clean.

To practice the invention, a radiation-curable substrate is prepared by conventional means. Virtually any radiation-curable substrate may be used. Thus, polyurethanes, polyethers, polyesters, acrylated polyesters, polyester urethane acrylics and the like which are curable by exposure to actinic radiation will demonstrate improved wear characteristics and cleanability when treated according to the present invention. These substrates may be treated while on an intermediate support surface or when in place on a finished product. For example, a UV-curable urethane wear layer for a flooring structure may be prepared and treated while supported on transfer sheeting, or it may be treated when in place on a floor matrix itself, such as a polyvinyl chloride floor matrix.

Furthermore, the substrate may comprise oligomers and other reactive diluents, alone or in combination. Examples of such materials are ethyl acrylate, propyl acrylate, isopropyl acrylate, butyl acrylate, t-butyl acrylate, 2-ethylhexyl acrylate, isodecyl acrylate, dicyclopentenyl acrylate, 2-phenoxyethyl acrylate, N,N-dimethylaminoethyl acrylate, ethyl methacrylate, propyl methacrylate, isopropyl methacrylate, butyl methacrylate, t-butyl methacrylate, 2-ethylhexyl methacrylate, isodecyl methacrylate, dicyclopentenyl methacrylate, 2-phenoxyethyl methacrylate, N,N-dimethylaminoethyl methacrylate, acrylic and methacrylic acid esters of lactic acid and stearic acid, hexanediol diacrylate, neopentyldiol diacrylate, ethylene glycol diacrylate, propylene glycol diacrylate, diethylene glycol diacrylate, 1,6-hexanediol diacrylate, ethylene glycol dimethacrylate, propylene glycol dimethacrylate, butylene glycol dimethacrylate, trimethylolpropane triacrylate, trimethylolpropane trimethacrylate, pentaerythritol di-, tri-, and tetraacrylate and mixtures thereof, pentaerythritol di-, tri-, and tetra-methacrylate and mixtures thereof, acrylated or methacrylated fatty acids such as linseed oil or soybean oil, acrylamide, methacrylamide, N-methyl acrylamide, N-ethyl acrylamide, N-propyl acrylamide and the like, N-methyl methacrylamide, N-ethyl methacrylamide N-propyl methacrylamide and the like, N,N-dimethyl acrylamide, N,N-diethyl acrylamide and the like, N,N-dimethyl methacrylamide, N,N-diethyl methacrylamide and the like, acrylic acid, methacrylic acid, 2-hydroxyethyl acrylate, 2-hydroxyethyl methacrylate, glycidyl acrylate, glycidyl methacrylate, allyl acrylate, allyl methacrylate, N-isobutoxy acrylamide, N-methylol acrylamide, vinyl acetate, N-vinylpyrrolidone, N-vinylimidazole, vinylpyridine, N-vinylpiperidone, and others.

The aqueous N-vinyl lactam solution will comprise from about 0.1 to about 75 percent by weight of an N-vinyl lactam and from about 0.01 to about 5 percent by weight of a suitable surfactant. Preferably, the solution will comprise from about 1 to about 50 percent by weight of lactam and from about 0.01 to about 2 percent by weight of surfactant, and more preferably, from about 1 to about 15 percent by weight of lactam and from about 0.1 to about 1 percent by weight of surfactant. The lactam of choice is N-vinylpyrrolidone, although other lactams such as N-vinyl-5-methylpyrrolidone, N-vinylpiperidone and N-vinylcaprolactam may also prove useful.

Any suitable surfactant or mixture of surfactants can be used, the only requirement being that it be compatible with the aqueous N-vinyl lactam solution and that it be suitable to wet the surface of the radiation-curable substrate. Superior results have been obtained with a series of non-ionic alkylphenoxyl polyoxyethylene ethanol surfactants sold by GAF Corporation under the "Igepal" trademark. In particular Igepal CO-610, which is a polyethylene oxide derivative of nonylphenol, has given especially satisfactory results with UV curable urethane wear layers when used at a level of 0.5 percent by weight in aqueous solution with 10 percent by weight of N-vinylpyrrolidone. However, other surfactants such as silicone surfactants, e.g., Dow Corning DC-193, which is polyethylene glycol siloxane, will also give satisfactory results.

The aqueous solution may be applied to the substrate by virtually any conventional means. For example, dip coating, flow coating, curtain coating and the like, all of which are well known in the coating industry, will give satisfactory results.

The uniqueness of the present invention becomes apparent when the aberrations obtained by modifying the present process are considered. For example, if the N-vinyl lactam or the surfactant are excluded from the aqueous solution, generally inferior surface coverings are obtained. Similarly, if the N-vinyl lactam or the surfactant are placed in the substrate instead of in the aqueous phase, a like result is obtained. From this it is apparent that both components must be present in the aqueous phase to obtain superior results. Nevertheless, inclusion of these ingredients both in the aqueous phase and in the substrate will not give adverse results.

The aqueous coating solutions may also comprise solvents and other components such as comonomers which will polymerize with the N-vinyl lactam and/or other cross-linkable compounds present in the solution or in the substrate. For example, the higher-molecular-weight surfactants of the Igepal series, e.g., Igepal CO-990, tend not to wet the surface of the substrate; however, by adding a water miscible organic solvent, such as isopropyl alcohol, which acts as a leveling agent and a wettability enhancer, wetting can be increased such that suitable results are obtained. Similarly, comonomers such as acrylamide, acrylic acid, 2-hydroxyethyl acrylate, vinyl acetate, methylol acrylamide, methacrylic acid, potassium acrylate, zinc acrylate, ethoxy ethoxyethyl acrylate, methacrylamido trimethylammonium chloride, and the like, may be incorporated, as may viscosity control agents, pigments, antifoam agents and flow agents. In addition, because the invention is operable over a wide pH range, agents may be added to adjust the pH to a desired level. Photoinitiators may also be included in the aqueous phase, although their presence is not necessary to achieve the superior results obtainable according to the present invention.

Although surfaces produced according to the present invention have shown improved durability and stain resistance, in some instances they have also shown a tendency to be somewhat slippery when wet. Depending upon the intended use, such a characteristic can be undesirable. Surprisingly, however, we have discovered that such slipperiness may be avoided or reduced by including in the aqueous phase one or more water soluble or partially water soluble diacrylate or triacrylate esters of a polyfunctional alcohol. More surprisingly, the inclusion of these di- or tri-acrylate esters increases the resistance to staining of the resulting surface. These materials, which are referred to herein ask multifunctional acrylate esters, have given improved surface properties when included in the aqueous phase at levels of from about 0.5 to about 25 percent by weight, but preferably at levels of from about 1 to about 5 percent by weight. Examples of representative multifunctional acrylate esters are tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

Another aspect of the present invention is the gloss level of surfaces produced thereby. Deglossing of the resulting surface tends to occur as the level of N-vinyl lactam in the aqueous phase increases; for example, if the amount of N-vinylpyrrolidone is increased from 1% to 10% in an aqueous phase containing only N-vinylpyrrolidone, Igepal CO-610 and water, the gloss of the cured surface may be sharply diminished. Nevertheless, the presence of comonomers in the aqueous phase tends to counteract this effect. Thus, if acrylamide is added to the above solution containing 10% N-vinylpyrrolidone, the gloss of the cured product will be higher than that of the sample which was treated with the solution containing N-vinylpyrrolidone and no acrylamide. Such gloss measurements are made by means well known in the art, such as by ANSI/ASTM D 523-78 which describes a method for determining specular gloss.

The following examples are provided to illustrate but not to limit the scope of the present invention.

EXAMPLE I

The following reactants were charged into a stirred, dry air-purged reactor.

| Ingredients | Grams |
| --- | --- |
| 4,4'-Diisocyanato dicyclohexylmethane | 4508.2 |
| Ionol (antioxidant) | 10.3 |
| 2-Ethylhexyl acrylate | 3332.4 |
| Dibutyltin dilaurate | 20.6 |
| 1,6-Hexanediol diacrylate | 2222.3 |

The mixture was heated to 130° F. and 1401.3 grams of 2-hydroxyethyl acrylate was metered into the reactor at a rate which did not allow the temperature to exceed 130° F. After one hour the following polyesters were charged to the reaction mixture cooled to 120° F.

| Polyester | Grams |
| --- | --- |
| Triol (Hooker F2039-180). Reaction product of 1 mole glycerol, 3 moles of a 7/3 mixture of adipic acid and isophthalic acid, and 3 moles 1,6-hexanediol; MW 960; Hydroxyl No. 175 | 3640.2 |
| Diol (Union Carbide PCP 0200). A polycaprolactone diol having a MW of 540 and a Hydroxyl No. of 207 | 3413.8 |

There was a small exotherm after which the reaction mixture was stirred at 140° F. for 4 hours. At the end of this period, infrared data showed the absence of isocyanate. The reaction mixture was cooled to 90° F. and the product (Product A) was placed in a Heresite lined drum.

Based on 100 parts by weight of Product A, 2.0% by weight of benzophenone photoinitiator was added together with 0.1% by weight of polyethylene glycol siloxane (Dow Corning DC-193). The coating thus formed had a viscosity of approximately 12,000 centipoises at room temperature and was comprised of 33.6% reactive diluents and 66.4% acrylate-capped urethane prepolymer.

A vinyl flooring tile was coated using a 3-mil Bird blade applicator and the coated tile was passed under two in-line 200-watt-per-inch medium-pressure mercury lamps at a speed of about 10 feet per minute (3 joules/cm$^2$ energy dose as determined by an International Light light meter) to cure the coating by photopolymerizing the ethylenically unsaturated components of the coating formulation. The coating on the tile was tack free, hard and glossy; however, the coating was less than desirable as a durable, tough clear coat for consumer application because it underwent excessive scratching and soiling under simulated wear conditions using a rotating abrasive wheel.

EXAMPLE II

To 100 parts of Product A were added 7.5 grams of acrylic acid, 2 grams of benzophenone and 0.1 gram of DC-193. The coating was applied to vinyl flooring tile using a Bird blade applicator and the 3-mil film was cured in the same manner as described in Example I. The cured film was tough and scratch resistant; however, the performance of this coating using the simulated wear test of Example I showed that it had undesirable wear properties because of excessive soiling and scratching.

EXAMPLE III

The composition of Example II was coated on flooring tile and, before the 3-mil, wet, uncured film was cured by ultraviolet light, it was overcoated with an aqueous solution of N-vinylpyrrolidone containing a nonionic surfactant. The composition of the aqueous overcoat was the following:

| Ingredient | Grams |
| --- | --- |
| Water | 90.0 |
| N—Vinylpyrrolidone | 10.0 |
| Igepal CO-610 | 0.5 |

The overcoat was applied by immersing the coated tile in the aqueous solution for about one second. The aqueous-over-nonaqueous (wet-on-wet) coated tile was immediately UV cured as described in Example I, washed with water to remove excess aqueous coating and air-dried to give a hard, tough, durable coating which had excellent properties as an abrasion resistant wear coating for flooring. The coating was particularly desirable as a floor coating because it had low soil pickup and was easier to clean than the products described in Examples I and II.

The specular gloss of the coated sample was measured essentially as described in ANSI/ASTM D 523-78. Light was directed onto the surface of the sample at an incident angle of 60° and the gloss was measured in relation to a reference standard using a Gardner gloss meter. The sample had a specular gloss of 34 when compared to a reference standard having a gloss of 94.

An examination of the surface of the film prepared by curing the wet-on-wet film showed by Fourier Transform Infrared (FTIR) spectroscopy that the surface of the cured film contained an appreciable amount of N-vinylpyrrolidone component in the cross-linked film whereas the under surface of the film showed no evidence that N-vinylpyrrolidone monomer units were contained in the polymer matrix. Although Applicants do not wish to be bound by any theory of operability, it is believed that the N-vinylpyrrolidone diffused into the surface of the nonaqueous layer and copolymerized with the polymerizable components therein. It is particularly surprising and unexpected that such a pronounced surface modification was obtained in the presence of water and in the absence of any photoinitiator in the aqueous phase.

EXAMPLE IV

The composition of Example II was applied to vinyl flooring using a Bird blade applicator and the 3-mil film was cured with ultraviolet light as described in Example I. After curing, a solution comprising 90 grams of water, 10 grams of N-vinylpyrrolidone and 0.5 gram of Igepal CO-610 was applied by flow coating to the cured coating. The resultant composition was immediately processed with ultraviolet light as described in Example I. The product was washed with water, dried, and evaluated for soiling and scratching using the simulated floor wear abrasion and soiling tester. The results showed that the performance of the coating was almost identical to that of Example II and was therefore judged to be undesirable as a coating for flooring because of excessive soiling and scratching. Thus, it is seen that treating a cured substrate according to the present invention does not produce satisfactory surface coverings.

EXAMPLE V

The composition of Example II was applied to vinyl flooring using a Bird blade applicator and the 3-mil film was exposed to the energy output of a single 200-watt medium-pressure mercury lamp in such a manner that the coating received an energy dose of 0.31 joules/cm$^2$. This dosage was achieved by using a line speed of 40 fpm and a one-eighth inch thick window glass filter between the sample and the lamp. The resultant tacky surface was flow coated with a solution comprising 90 grams of water, 10 grams of N-vinylpyrrolidone and 0.5 gram of Igepal CO-610 and was then immediately passed through the radiation output of two 200-watt medium pressure mercury lamps at 15 fpm, thereby receiving an energy dose of 3.0 joules/cm$^2$. An evaluation for soiling, scratching and cleanability showed that the product gave better performance than the products of Examples II and IV.

EXAMPLE VI

To 100 parts of Product A were added 7.5 grams of acrylic acid, 1 gram of Irgacure 651 photoinitiator (2,2-dimethoxyphenyl acetophenone) and 0.1 gram of DC-193. The coating was applied to vinyl flooring tile using a Bird blade applicator and the 3-mil film was exposed to the output of a 200-watt medium pressure mercury lamp as described in Example V in such a manner that the sample received an energy dose of 0.31 joules/cm$^2$. The resultant tacky surface was flow coated with a solution comprising 90 grams of water, 10 grams of N-vinylpyrrolidone and 0.5 gram of Igepal CO-610 and was then immediately exposed to 3.0 joules/cm$^2$ of ultraviolet light output from two medium-pressure mercury lamps. The product was washed with water and dried. The hard, glossy coating was found to be better than the products of Examples II and IV as a wear coating for flooring since it soiled less, was more scratch resistant and was easier to clean.

EXAMPLES VII-X

To demonstrate the versatility of the wet-on-wet coating process using aqueous-on-nonaqueous coating phases, the following aqueous compositions were prepared.

| | Examples Weight of Components (grams) | | | |
| --- | --- | --- | --- | --- |
| Components | VII | VIII | IX | X |
| Water | 85 | 85 | 90 | 90 |
| N—Vinylpyrrolidone | 10 | 10 | 10 | 10 |
| Ethoxy ethoxyethyl acrylate | 5 | — | — | — |
| Methacrylamido trimethylammonium chloride | — | 5 | — | — |
| Polyvinylpyrrolidone (MW 10,000) | — | — | 1 | — |
| Acrysol A-5 (Rohm & Haas) - 25% aqueous solution of polyacrylic acid (MW = less than 300,000) | — | — | — | 4 |
| Igepal CO-610 | 0.5 | 0.5 | 0.5 | 0.5 |

These aqueous compositions were used to coat the photocurable nonaqueous composition described in Example II. Three-mil wet draw-downs of the nonaqueous composition on vinyl tile were separately coated with the four aqueous compositions by dip coating for one second. The wet-on-wet coated tiles were immediately passed under medium-pressure mercury lamps as described in Example I. After washing with water and drying, the treated samples were examined for soiling and scratching as described in Example I by using a rotating abrasive wheel. All four of the samples showed better performance than the sample in Example II wherein no aqueous coating was employed. Also, each of the four samples was much easier to clean than the composition of Example II after the soiling test. These results show that comonomers with N-vinylpyrrolidone can be employed in the aqueous phase (Example IV & V) and that water soluble polymers such as polyvinylpyrrolidone and polyacrylic acid (Examples VI & VII) may also be present in the aqueous phase without detracting from the excellent performance of the wet-on-wet ultraviolet light-cured coatings.

EXAMPLES XI–XIII

The following series of formulations demonstrates the wide variation in the amount of N-vinylpyrrolidone that is permitted in the aqueous phase while still retaining the advantages of this invention.

| Components | Examples Weight of Components (grams) | | |
|---|---|---|---|
|  | XI | XII | XIII |
| Water | 99.0 | 95.0 | 75.0 |
| N—Vinylpyrrolidone | 1.0 | 5.0 | 25.0 |
| Igepal CO-610 | 0.5 | 0.5 | 0.5 |

These aqueous compositions were used to coat the photocurable nonaqueous composition described in Example II. Three-mil wet draw-downs of this nonaqueous composition on vinyl tile were coated with the above aqueous compositions and each wet-on-wet biphase coating was immediately cured with ultraviolet light as described in Example I. After washing and drying, the coatings were evaluated for soiling, scratching and cleanability, and all three were found to behave as expected. The performance was essentially identical to that obtained with the 10% aqueous N-vinylpyrrolidone solution as described in Example III; that is, the coatings were superior in performance when compared to the nonaqueous UV-curable coating as described in Example II which was not coated wet-on-wet with the N-vinylpyrrolidone solution.

Furthermore, specular gloss values were measured for Examples XI and XII using the procedure set forth in Example III. Values of 92 and 82, respectively, were obtained. These results, in combination with the value obtained for Example III, indicate that gloss values tend to decrease as the amount of N-vinylpyrrolidone in the aqueous solution is increased.

EXAMPLES XIV–XVI

Following are compositions wherein the amount of acrylic acid in the nonaqueous phase of the final coating is varied. Three-mil draw downs of these formulations were made on vinyl tile and, before curing, the tiles were overcoated (wet-on-wet) with an aqueous solution comprising 90 grams of water, 10 grams of N-vinylpyrrolidone and 0.5 gram of Igepal CO-610. The samples were cured with ultraviolet light as described in Example I and then washed and dried. Evaluation of the cured coatings using a simulated foot wear traffic test showed excellent performance in all three cases. Cleanability was also improved compared to cured coatings which were not overcoated with the above solution.

| Components | Examples Weight of Components (grams) | | |
|---|---|---|---|
|  | XIV | XV | XVI |
| Product A (from Example I) | 100 | 100 | 100 |
| Acrylic Acid | 2 | 4 | 6 |
| DC-193 | 0.1 | 0.1 | 0.1 |
| Benzophenone | 2.0 | 2.0 | 2.0 |
| Benzoin Isobutyl Ether | 1.0 | 1.0 | 1.0 |

EXAMPLES XVII–XIX

The following three examples demonstrate the use of zinc acrylate as a water soluble comonomer with N-vinylpyrrolidone for coating Product A which also contains 2% by weight of benzophenone, 1% by weight of Irgacure 651 photoinitiator and 0.1% by weight of DC-193. Three-mil draw downs of this composition were coated (wet-on-wet) with the aqueous compositions designated below by dip coating and the coated surfaces were immediately cured with ultraviolet light as described in Example I. Evaluation of the cured coating showed that it was hard, glossy and scratch resistant with excellent cleanability performance with mild detergent. A control sample, on the other hand, was as described in Example I and was inferior in performance.

| Components | Examples Weight of Components (grams) | | |
|---|---|---|---|
|  | XVII | XVIII | XIX |
| Water | 81 | 72 | 45 |
| Zinc Acrylate (10% in water) | 10 | 20 | 50 |
| N—Vinylpyrrolidone | 9 | 8 | 5 |
| Igepal CO-610 | 0.5 | 0.5 | 0.5 |

EXAMPLE XX

The composition of Example II was coated on a flexible vinyl sheet flooring using a three-mil Bird blade applicator. The wet uncured film was coated (wet-on-wet) with an aqueous solution containing 90 grams of water, 10 grams of N-vinylpyrrolidone and 0.5 gram of Igepal CO-610. The product was immediately treated with ultraviolet light as outlined in Example I and evaluated for abrasion resistance and cleanability using the uncoated vinyl flooring substrate from Example II as a control. The coated sample was less scratched than the control using a simulated floor wear abrasion test and the coated sample was much easier to clean than the control.

EXAMPLE XXI

A 3-mil layer of the composition of Example II was coated on flooring tile, but before the wet uncured film was exposed to ultraviolet light, it was overcoated by flow coating with an aqueous solution containing 90 grams of water, 10 grams of N-vinylpyrrolidone, 2 grams of tetrabutylammonium bromide and 0.5 gram of Igepal CO-530, another polyethylene oxide derivative of nonyl phenol. The wet-on-wet coating was immediately exposed to ultraviolet light as described in Example I. After washing with water to remove excess aqueous coating and air drying, a hard, tough and abrasion resistant coating was obtained. It was particularly desirable as a floor coating because it had low soil pickup, was easy to clean, had good heat and light stability and, in general, comprised a better no-wax wear layer than the coating described in Examples I and II. This example illustrates that phase transfer agents such as tetrabutylammonium bromide may also be included in the aqueous solution without adverse effect.

EXAMPLE XXII

The composition of Example I was coated on flooring tile using a 3-mil Bird blade and the uncured film was curtain-coated with an aqueous solution comprising 90 grams of water, 5 grams of N-vinylpyrrolidone, 5 grams of acrylic acid and 0.5 gram of Igepal CO-610. The coated tile was passed under 200-watt medium-pressure mercury lamps in an air atmosphere according to the procedure described in Example I. The product was washed with water and dried to give a hard, glossy, abrasion resistant coating with excellent ease of cleanability and was judged to be superior in performance to the coating described in Example I. This example illustrates that other comonomers, such as acrylic acid, may also be included in the aqueous solution.

EXAMPLES XXIII

To demonstrate the use of a cosolvent to aid in obtaining a homogeneous aqueous phase using a water insoluble comonomer the following composition was prepared.

| Ingredient | Grams |
| --- | --- |
| Water | 80.0 |
| N—Vinylpyrrolidone | 6.0 |
| Tetrahydrofurfuryl acrylate | 4.0 |
| Igepal CO-610 | 0.5 |
| Ethanol | 10.0 |

Without the addition of ethanol, tetrahydrofurfuryl acrylate was insoluble in a mixture of the other listed ingredients. The composition was flow coated onto a 3-mil uncured film of the ultraviolet light curable composition of Example II on flooring tile and the aqueous over nonaqueous coating was immediately cured by ultraviolet light as described in Example I. After washing with water and air-drying, the hard, glossy surface was evaluated as a protective wear coat using the simulated wear test of Example I. The results showed that this product had better performance than the cured product of Example II, being more resistant to soiling and scratching.

EXAMPLE XXIV

The composition of Example II was coated on vinyl flooring tile and, before the 3-mil, wet, uncured film was cured by ultraviolet light, it was flow coated with the following composition to give a smooth, evenly distributed aqueous-over-nonaqueous wet biphase coating. A sample treated with a similar solution containing no isopropyl alcohol did not wet the nonaqueous phase completely.

| Components | Weight (grams) |
| --- | --- |
| Water | 80 |
| N—Vinylpyrrolidone | 10 |
| Igepal CO-990 | 0.5 |
| Isopropyl alcohol | 10 |

The aqueous-over-nonaqueous coated tile was immediately cured by ultraviolet light as described in Example I, washed with water and air dried to give a hard, scratch resistant surface. It was then evaluated as a protective wear coat using the simulated wear test of Example I. The results showed that this product had better performance than the cured product of Example II, being more resistant to soiling and scratching.

EXAMPLE XXV

This example demonstrates that the wet-on-wet coating process of the present invention also enhances the floor wear performance of other ultraviolet light-curable coatings. The preparation and use of an acrylated polyester is described rather than an acrylated polyester urethane as used in the previous examples. The acrylated polyester was prepared in two steps, Step 1 being a polyesterification reaction and Step 2 being acrylation of the hydroxy-terminated polyester.

Step 1. Product B was prepared by charging into a 5-liter, 4-neck, round-bottom flask, the following ingredients:

| Ingredient | Grams |
| --- | --- |
| Isophthalic acid | 973 |
| Phthalic anhydride | 868 |
| 1,6-Hexanediol | 1148 |
| Neopentyl glycol | 427 |
| Cyclohexane dimethanol (CHDM-R90 Eastman Chem. Prod.) | 94 |
| Dibutyltin bis-lauryl mercaptide | 3.2 |
| Foamkill 8R | 1 drop |

The flask was equipped with a metal stirrer, nitrogen inlet, thermometer and an upright steam heated column packed with glass helices. The pot temperature was slowly raised to 428° F. The nitrogen flow was maintained at 1.25 standard cubic feet per hour (SCFH) over the duration of the reaction and the water by-product was removed until the acid number was less than 1. Analysis of Product B gave a hydroxyl number of 84.2 and an acid number of 0.3.

Step 2. The acrylated polyester (Product C) was prepared by charging the following ingredients into a 2-liter, 4-neck, round-bottom flask.

| Ingredient | Grams |
| --- | --- |
| Polyester (Product B) | 1041.0 |
| Toluene | 237.0 |
| Acrylic acid | 144.0 |
| Hydroquinone | 0.116 |
| p-Methoxyphenol | 0.231 |
| Sulfuric acid | 2.84 |

The temperature of the reaction mixture was raised to 221° F. with a nitrogen flow of 1.25 SCFH. A total of 21.7 ml of water was removed using a Barrett trap and a water cooled condenser. The acrylated polyester was then cooled to room temperature and the trap and condenser were replaced with a distilling head. The temperature was raised until the mixture was stirrable and 1.33 grams of magnesium oxide and 11.6 grams of butyl benzyl phthalate were added. The temperature was raised to 221° F. and a vacuum (50 mm Hg) was applied; 170 ml of organic distillate was removed. The final acrylated polyester (Product C) had a viscosity of 112,600 cps, an acid number of 19.56 and a hydroxyl number of 10.6.

The acrylated polyester was formulated as follows:

| Ingredient | Grams |
| --- | --- |
| Acrylated polyester (Product C) | 100.0 |
| Acrylic acid | 7.5 |
| Irgacure 651 | 1.0 |
| Benzophenone | 2.0 |

A 3-mil draw down of formulated Product C was UV cured on a tile substrate as described in Example I. It was subjected to simulated floor traffic conditions but performed poorly, showing excessive scratching and soiling and poor cleanability. When the same coating on tile before curing was dip coated with a solution containing 90 grams of water, 10 grams of N-vinylpyrrolidone and 0.5 gram of Igepal CO-610, and then cured in the same manner, the resultant coating had excellent cleanability, low soiling characteristics and was more resistant to scratching.

EXAMPLE XXVI

This example illustrates the improved surface characteristics which may be obtained if a multifunctional acrylate ester is included in the aqueous phase. A solution comprising the following ingredients was prepared:

| Ingredient | Grams |
| --- | --- |
| Water | 90.0 |
| N—Vinylpyrrolidone | 7.0 |
| Diethylene glycol diacrylate | 2.0 |
| Igepal CO-610 | 0.5 |

This solution was coated onto the 3-mil, wet, uncured film described in Example II and the coated film was immediately cured with ultraviolet light as described in Example I. The wear performance of the resulting surface was comparable to that of the surface obtained in Example III; however, this surface was less susceptible to staining by ordinary household stains such as merurochrome, mustard, shoe polish and the like. In addition, the surface of the cured coating also appeared to show improved slip resistance when compared to a sample prepared according to Example III.

The present invention is not restricted solely to the descriptions and illustrations provided above but encompasses all modifications envisaged by the following claims.

We claim:

1. A process for preparing a composite layer material comprising the steps of:
   depositing a first layer of a composition which is curable by exposure to actinic radiation on a support,
   preparing a solution comprising water, from about 0.1 to about 75% by weight of an N-vinyl lactam having the structure

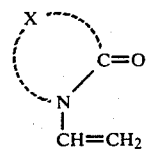

where X is an alkylene bridge having 3 to 5 carbon atoms, and from about 0.01 to about 5% by weight of a suitable surfactant which is compatible with said lactam and which enables said solution to wet said first layer,
   depositing a layer of said solution on said first layer, and
   exposing the pair of layers to actinic radiation.

2. The process as set forth in claim 1 hereof wherein said solution comprises from about 1 to about 50% by weight of N-vinyl lactam and from about 0.01 to about 2% of surfactant.

3. The process as set forth in claim 1 hereof wherein said solution comprises from about 1 to about 15% by weight of N-vinyl lactam and from about 0.1 to about 1% by weight of surfactant.

4. The process as set forth in claims 1, 2 or 3 hereof wherein said N-vinyl lactam is N-vinylpyrrolidone.

5. The process as set forth in claim 4 hereof wherein said solution comprises a water miscible organic solvent which is suitable to act as a leveling agent and wettability enhancer.

6. The process as set forth in claim 4 hereof wherein said first layer comprises a polyurethane.

7. The process as set forth in claim 4 hereof wherein said first layer comprises a polyester.

8. The process as set forth in claim 4 hereof wherein said first layer comprises an acrylated polyester.

9. The process as set forth in claim 4 hereof wherein said first layer comprises a polyether.

10. The process as set forth in claim 4 hereof wherein said first layer comprises a polyester urethane acrylic.

11. The process as set forth in claim 4 hereof wherein said surfactant is a non-ionic surfactant.

12. The process as set forth in claim 11 hereof wherein said surfactant is an alkylphenoxy polyoxyethylene ethanol.

13. The process as set forth in claim 12 hereof wherein said surfactant is a nonylphenoxy polyoxyethylene ethanol.

14. The process as set forth in claim 11 hereof wherein said surfactant is a silicone surfactant.

15. The process as set forth in claim 14 hereof wherein said surfactant is polyethylene glycol siloxane.

16. The process as set forth in claim 4 hereof wherein said solution comprises a comonomer.

17. The process as set forth in claim 4 hereof wherein said solution comprises at least one multifunctional acrylate ester.

18. The process as set forth in claim 17 hereof wherein said solution comprises from about 0.5 to about 25% by weight of said ester.

19. The process as set forth in claim 17 hereof wherein said solution comprises from about 1 to about 5% by weight of said ester.

20. The process as set forth in claim 17 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

21. The process as set forth in claim 20 hereof wherein said solution comprises from about 0.5 to about 25% by weight of said ester.

22. The process as set forth in claim 20 hereof wherein said solution comprises from about 1 to about 5% by weight of said ester.

23. The process as set forth in claim 5 hereof wherein said first layer comprises a polyurethane.

24. The process as set forth in claim 5 hereof wherein said first layer comprises a polyester.

25. The process as set forth in claim 5 hereof wherein said first layer comprises an acrylated polyester.

26. The process as set forth in claim 5 hereof wherein said first layer comprises a polyether.

27. The process as set forth in claim 5 hereof wherein said first layer comprises a polyester urethane acrylic.

28. The process as set forth in claim 5 hereof wherein said surfactant is a non-ionic surfactant.

29. The process as set forth in claim 28 hereof wherein said surfactant is an alkylphenoxy polyoxyethylene ethanol.

30. The process as set forth in claim 29 hereof wherein said surfactant is a nonylphenoxy polyoxyethylene ethanol.

31. The process as set forth in claim 28 hereof wherein said surfactant is a silicone surfactant.

32. The process as set forth in claim 31 hereof wherein said surfactant is polyethylene glycol siloxane.

33. The process as set forth in claim 5 hereof wherein said solution comprises a comonomer.

34. The process as set forth in claim 5 hereof wherein said solution comprises at least one multifunctional acrylate ester.

35. The process as set forth in claim 34 hereof wherein said solution comprises from about 0.5 to about 25% by weight of said ester.

36. The process as set forth in claim 34 hereof wherein said solution comprises from about 1 to about 5% by weight of said ester.

37. The process as set forth in claim 34 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

38. The process as set forth in claim 37 hereof wherein said solution comprises from about 0.5 to about 25% by weight of said ester.

39. The process as set forth in claim 37 hereof wherein said solution comprises from about 1 to about 5% by weight of said ester.

40. A composite layer material having improved durability, abrasion resistance, and stain resistance, said material being obtained by irradiating with actinic radiation a first uncured layer which is curable by exposure to said radiation, said layer being coated prior to irradiation with a layer of an aqueous solution comprising from about 0.1 to about 75% by weight of an N-vinyl lactam having the structure

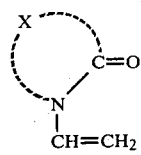

where X is an alkylene bridge having 3 to 5 carbon atoms, and from about 0.01 to about 5% by weight of a suitable surfactant which is compatible with said lactam and which enables said solution to wet said first layer.

41. The invention as set forth in claim 40 hereof wherein said solution comprises from about 1 to about 50% by weight of N-vinyl lactam and from about 0.01 to about 2% by weight of surfactant.

42. The invention as set forth in claim 40 hereof wherein said solution comprises from about 1 to about 15% by weight of N-vinyl lactam and from about 0.1 to about 1% by weight of surfactant.

43. The invention as set forth in claims 40, 41 or 42 hereof wherein said N-vinyl lactam is N-vinylpyrrolidione.

44. The process as set forth in claim 43 hereof wherein said solution comprises a water miscible organic solvent which is suitable to act as a leveling agent and wettability enhancer.

45. The invention as set forth in claim 43 hereof wherein said first layer comprises a polyurethane.

46. The invention as set forth in claim 43 hereof wherein said first layer comprises a polyester.

47. The invention as set forth in claim 43 hereof wherein said first layer comprises an acrylated polyester.

48. The invention as set forth in claim 43 hereof wherein said first layer comprises a polyether.

49. The invention as set forth in claim 43 hereof wherein said first layer comprises a polyester urethane acrylic.

50. The invention as set forth in claim 43 hereof wherein said surfactant is a non-ionic surfactant.

51. The invention as set forth in claim 50 hereof wherein said surfactant is an alkylphenoxy polyoxyethylene ethanol.

52. The invention as set forth in claim 51 hereof wherein said surfactant is a nonylphenoxy polyoxyethylene ethanol.

53. The invention as set forth in claim 50 hereof wherein said surfactant is a silicone surfactant.

54. The invention as set forth in claim 53 hereof wherein said surfactant is polyethylene glycol siloxane.

55. The invention as set forth in claim 43 hereof wherein said solution comprises a comonomer.

56. The invention as set forth in claim 43 wherein said solution comprises at least one multifunctional acrylate ester.

57. The invention as set forth in claim 56 hereof wherein said solution comprises from about 0.5 to about 25% by weight of said ester.

58. The invention as set forth in claim 56 hereof wherein said solution comprises from about 1 to about 5% by weight of said ester.

59. The invention as set forth in claim 56 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

60. The invention as set forth in claim 59 hereof wherein said solution comprises from about 0.5 to about 25% by weight of said ester.

61. The invention as set forth in claim 59 hereof wherein said solution comprises from about 1 to about 5% by weight of said ester.

62. The invention as set forth in claim 44 hereof wherein said first layer comprises a polyurethane.

63. The invention as set forth in claim 44 hereof wherein said first layer comprises a polyester.

64. The invention as set forth in claim 44 hereof wherein said first layer comprises an acrylated polyester.

65. The invention as set forth in claim 44 hereof wherein said first layer comprises a polyether.

66. The invention as set forth in claim 44 hereof wherein said first layer comprises a polyester urethane acrylic.

67. The invention as set forth in claim 44 hereof wherein said surfactant is a non-ionic surfactant.

68. The invention as set forth in claim 67 hereof wherein said surfactant is an alkylphenoxy polyoxyethylene ethanol.

69. The invention as set forth in claim 68 hereof wheerein said surfactant is a nonylphenoxy polyoxyethylene ethanol.

70. The invention as set forth in claim 67 hereof wherein said surfactant is a silicone surfactant.

71. The invention as set forth in claim 70 hereof wherein said surfactant is polyethylene glycol siloxane.

72. The invention as set forth in claim 44 hereof wherein said solution comprises a comonomer.

73. The invention as set forth in claim 44 hereof wherein said solution comprises at least one multifunctional acrylate ester.

74. The invention as set forth in claim 73 hereof wherein said solution comprises from about 0.5 to about 25% by weight of said ester.

75. The invention as set forth in claim 73 hereof wherein said solution comprises from about 1 to about 5% by weight of said ester.

76. The invention as set forth in claim 73 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

77. The invention as set forth in claim 75 hereof wherein said solution comprises from about 0.5 to about 25% by weight of said ester.

78. The invention as set forth in claim 75 hereof wherein said solution comprises from about 1 to about 5% by weight of said ester.

* * * * *

UNITED STATES PATENT AND TRADEMARK OFFICE
CERTIFICATE OF CORRECTION

PATENT NO.   : 4,420,499
DATED        : December 13, 1983
INVENTOR(S)  : Nicholas C. Bolgiano et al.

It is certified that error appears in the above-identified patent and that said Letters Patent are hereby corrected as shown below:

In the Abstract, lines 4 and 5 should be corrected to read --whereby a first layer which is curable by actinic radiation, on a support, is coated--.

In the Specification, in column 5, line 34, the word "ask" should read --as--, and in column 11, line 2, the word "coating" should read --coatings--.

In the Claims, claim 40 at column 15, line 48, the word "uncured" should be deleted such that line 4 reads --a first layer--. In claim 69, line 2, the word "wheerein" should read --wherein--.

Signed and Sealed this

Sixth Day of March 1984

[SEAL]

Attest:

GERALD J. MOSSINGHOFF

*Attesting Officer*   *Commissioner of Patents and Trademarks*